May 4, 1954  R. S. HALEY  2,677,733
TRIP-CONTROLLED ELECTRIC CONTACT BREAKER GOVERNOR
Filed Aug. 5, 1949  2 Sheets-Sheet 1

Inventor
Richard S. Haley

By Clarence A. O'Brien
and Harvey B. Jacobson
Attorneys

May 4, 1954   R. S. HALEY   2,677,733
TRIP-CONTROLLED ELECTRIC CONTACT BREAKER GOVERNOR
Filed Aug. 5, 1949   2 Sheets-Sheet 2
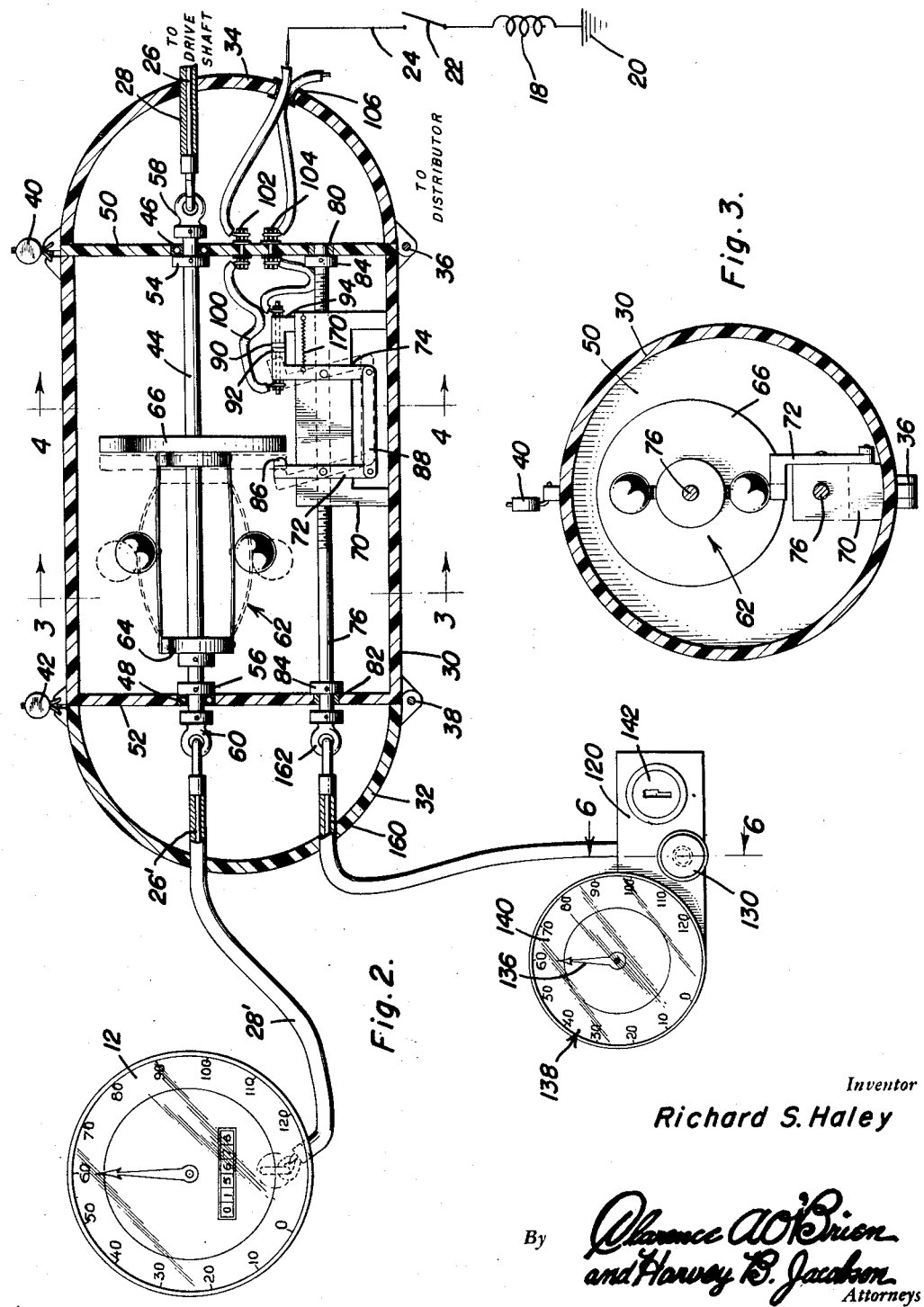
Inventor
Richard S. Haley
By Clarence A. O'Brien
and Harvey B. Jackson
Attorneys Patented May 4, 1954

2,677,733

UNITED STATES PATENT OFFICE 2,677,733

TRIP-CONTROLLED ELECTRIC CONTACT BREAKER GOVERNOR

Richard S. Haley, Sioux City, Iowa

Application August 5, 1949, Serial No. 108,727

1 Claim. (Cl. 200—80)

This invention relates to novel and useful improvements in attachments for vehicles.

An object of this invention is to regulate the maximum speed of a vehicle through the medium of an operator which is connected with means for so regulating the speed, the operator being controlled by means of a key and lock so that once the desired maximum speed is set, it requires the same key (or one identical thereto) to change the maximum speed limitation imposed on the vehicle.

Another object of this invention is to reflect directly on a dial which is calibrated in accordance with the corresponding speed of the vehicle as when being viewed on the speedometer, the speed of the vehicle which is to be the maximum.

Another object of this invention is to adjust and regulate a switch mechanism which is interposed in the distributor circuit so that the speed responsive governor, preferably of the flyball type, is rendered operative to such an extent and degree as to operate the switch at the various pre-selected speeds.

Another object of this invention is to incorporate the teachings herein either in existing vehicles or vehicles in their manufacture and to obtain rotative speed of the governor by a convenient connection with any component of the vehicle which is operated proportional to the forward movement of the vehicle.

Ancillary objects and features of novelty will become apparent to those skilled in the art in following the description of the preferred form of the invention, illustrated in the accompanying drawings, wherein:

Figure 2 is a longitudinal sectional view of the casing or housing for the various components to be disposed therein together with an elevational showing of a conventional speedometer together with the dial and operator mechanism forming an important part of the invention;

Figure 3 is a transverse sectional view taken substantially on the line 3—3 of Figure 2 in the direction of the arrows;

Figure 6:
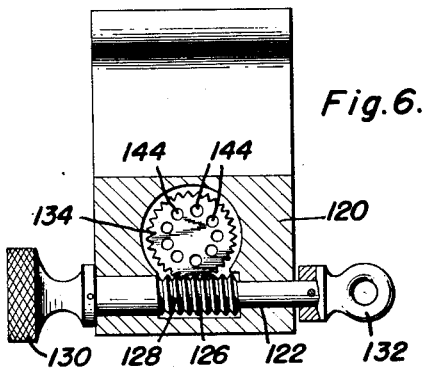
Figure 4:
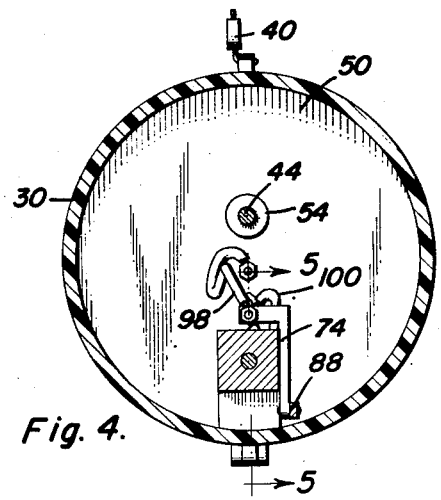
Figure 4 is a transverse sectional view taken on the line 4—4 of Figure 2 and in the direction of the arrows.
Figure 5:
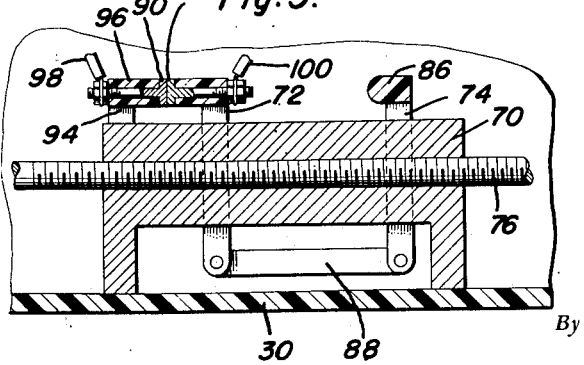

Figure 5 is a sectional view of the switch and a portion of the operating means therefor, used for the purpose of opening and closing a necessary circuit for engine operation such as the circuit including the distributor of the vehicle; and Figure 6 is a transverse sectional view of a portion of the switch control operator taken substantially on the line 6—6 of Figure 2 and in the direction of the arrows.

Conventional vehicle structure

Figure 1:
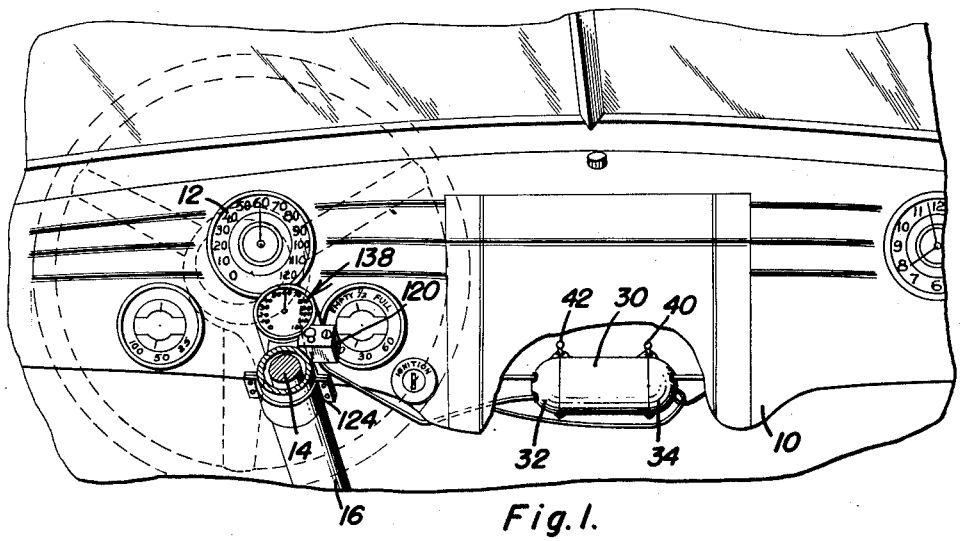
Figure 1 is a fragmentary elevational view of a portion of the interior of the vehicle having parts broken away in section (steering wheel and steering column) so as to illustrate the more pertinent parts of the vehicle and the device of the invention as applied to a vehicle.

The vehicle dashboard 10 is illustrated in Figure 1 and includes certain various appurtenances contiguous to a vehicle such as the conventional speedometer 12 together with a steering column 14 and its housing 16.

The distributor coil 18 is shown as having its necessary ground 20 and an ignition switch 22 is interposed in the line 24.

A speedometer cable 26 disposed in its sheath 28 is interrupted but continues at 26' and 28'.

Structure of one embodiment

The casing 30 is illustrated as being composed of a commercial plastic material with hemispherical end sections 32 and 34, respectively, hinged thereto by means of the hinges 36 and 38. Seals 40 and 42, respectively, passed through suitable apertures in ears attached to the end sections and the housing center part 30, maintain the end sections in place so that they cannot be opened without breaking the seals.

A shaft 44 is disposed in suitable anti-friction bearings 46 and 48 which are carried by the end partitions or walls 50 and 52 of the housing or case 30. Thrust bearings 54 and 56 are fixed to the shaft 44 and there is an eye 58 and an eye 60 disposed at opposite ends of the said shaft 44 and within the hemispherical end sections 32 and 34, respectively.

A conventional flyball governor generally indicated 62 is disposed on the shaft 44 in the usual manner, that is, one end 64 being fixed and the other end 66 being slidable thereon. The said end 66 is of ample diameter so as to operate a switch operating mechanism or device which is disposed on the bottom of the case 30.

This switch operating device consists of a support 70 which is disposed on the bottom of the case 30 and which has a pair of parallel arms 72 and 74, respectively, pivoted thereto by means of suitable pivot pins. A screw 76 is threadedly disposed in an internally threaded bore within the threaded element or member 70 so that rotation of the screw is imparted to the support 70 whereby it is moved axially with respect to the screw 76. The said screw 76 is mounted at its ends in suitable bearings 80 and 82, respectively, which are carried by the ends 50 and 52 of the case 30. Thrust bearings 84 are disposed on the screw 76 to serve their conventional function.

The upper end of the arm or link 72 has a foot 86 integral therewith for engagement by the end 66 of the flyball governor mechanism 62. Accordingly, since the shaft 44 and the screw 76 are parallel to each other, when the end 66 of the flyball governor is operated, the arm 72 is pivoted by engagement of the end 66 with the foot 86. But, the arm 72 has a pitman 88 secured thereto and also to the said arm 74. The upper end of the arm 74 has a contact 92 carried thereby for engagement with a contact 90 which is fixed on the post 94. Suitable insulation 96 is disposed in appropriate places with respect to each contact, insulating it from the arm 74 and the post 94, respectively. The wires 98 and 100, respectively, are attached to suitable posts which are in electrical communication with the contacts 90 and 92.

The said wires 98 and 100 are attached to binding posts 102 and 104, which binding posts are carried by the end 50 of the case 30 and which binding posts pass therethrough. The wire 24, previously described, is passed through a grommet 106 in the hemispherical end section 34 and terminates in electrical communication with the binding post 102. Then the wire 24 in effect continues through the binding post 102, through the switch mechanism including the contacts and then through the binding post 104 through the medium of the wire 98 so that the said conductor 24 may then extend to the distributor.

A block 120 having a longitudinal passage 122 therethrough is provided with a suitable clamp (Figure 1) 124 for fixing the block to the steering column housing 16, whereby it may be conveniently accessible to the operator of the vehicle. The passage 122 has an enlargement 126 therein to accommodate the worm 128. This worm forms a part of an operator for the screw 76. A suitable knob 130 is secured to the small length of shaft having the worm 128 therein and has an eye or other suitable coupling 132 at the opposite end thereof.

The worm is enmeshed with a gear 134 which through conventional gearing is adapted to operate the needle or pointer 136.

The pointer forms a part of a gauge or indicator generally indicated at 138 which is calibrated in the same manner as an ordinary speedometer 12. The calibrations of the indicator face 140 are in this country, miles per hour.

An ordinary lock 142 of the key-controlled type is disposed in the block 120. The keeper of the lock is disposed in one of the series of openings 144 formed in the said gear 134. Hence, when the key-operated lock is turned to the inoperative position, the operator mechanism may be actuated by means of the knob 30. But, when the key-operated lock 142 is in the operative position, the plunger or keeper thereof passes into one of the series of apertures 144 thereby preventing rotation of the operator by holding the gear 134 which is in mesh with the worm 128.

Operation

When the vehicle attains a speed, in the normal course of events, the speedometer cable 26 is rotated. However, interposed in the speedometer cable is the mechanism disclosed in Figure 2. When this mechanism is rotated, as by the speedometer cable 26 or any other component which is actuated proportional to the speed of the vehicle, the flyball governor 62 is also operated. When this flyball governor has its slidable end 66 pulled inwardly a sufficient amount as to operate the switch mechanism, the distributor circuit is broken. Any other circuit which is necessary for the operation of the vehicle may be broken by simply appropriately connecting the wiring.

When it is desired to set the speed governor and have it maintained in the predetermined position, it is necessary only to rotate the knob 130 to obtain a reading on the dial face 140 indicating the number of miles per hour at which the flyball governor end 66 will operate the switch to break the vehicle engine circuit.

When the knob 130 is so rotated, it is locked in the desired position by means of a key whereby removal of the key renders it exceedingly difficult and, in fact, impossible without damage, to reset the governor mechanism.

In practicing the invention it is, of course, necessary that the threads on the screw 76 be of such pitch when taken into consideration with the resiliency in the spring arms of the flyball governor that the markings on the dial properly reflects miles per hour in connection with the speed of the vehicle.

What happens specifically when the knob 130 is rotated, the hand or pointer 136 is also rotated to indicate on the dial face 140. But, at the same time, since the cable 160 is attached in the eye 162 at the end of the screw 76 and is also attached at the other end in the eye 132, the screw 76 is rotated. This rotation moves the support 70 axially with respect to the case 30. Hence, the arms 72 and 74 together with the pitman 88 are shifted bodily within the case 30 by the action of the screw in the threaded bore of the support 70. Accordingly, it requires a larger travel of the end 66 of the flyball governor to sufficiently operate the arms whereby the contacts 90 and 92 are separated from each other.

In order to insure proper contacting relationship of the two contacts 90 and 92, a spring 170 is fixed to the arm 74 and also to the support 70. The spring opposes the pivotal operation of the arm 74 as actuated by the end 66 of the flyball governor 62. Conversely, the spring 170 constantly pulls the arm 74 toward the post 92 thereby pressing the two contacts 90 and 92 together.

It is contemplated by the present invention to supply such a governor as standard and original equipment in vehicles. In this event, it would be unnecessary entirely to have the various separated units to form the invention. It would only be necessary to include all of the structure within a single case, also including the speedometer, which is conventional equipment of the vehicle.

Another contemplation of the invention is the utility of the original speedometer cable which is easily cut and fitted at its ends, when the device is applied to existing vehicles as an attachment rather than standard equipment.

If desirable, a separate cable could be run to an appropriate member of the transmission or drive shaft of the vehicle whereby the same gear which is used to operate the vehicle speedometer cable could be used to operate a separate cable for the shaft 44.

In order that there be no possibility of conducting current from the arms 72 and 74, the insulating material finger 86 is employed as disclosed in Figure 5. In fact, all of the arms (72, 74 and 88) are preferably of electrically insulating material in that they are light in weight and prevent harmful and undesirable transfer of current thereto.

Having described the invention, what is claimed as new is:

In a speed control device for interrupting the ignition circuit of an automobile, the combination with a governor on the automobile operatively connected to a wheel of an automobile and including a member variably shiftable according to the speed of the automobile, of a block slidably mounted contiguous to said member and having a contact thereon in said circuit, a pair of parallel laterally spaced arms pivotally mounted intermediate their ends on said block and between which said member shifts and engages and operates one arm in one direction, a contact on the other arm in said circuit, a spring attached to said other arm and to the block and yieldingly holding said other arm with the contact thereon engaged with the contact on the block to close said circuit, a link pivotally connecting said one arm to said other arm to move the same in said one direction for disengaging said contacts to interrupt the circuit, and screw feed means for sliding said block to vary bodily the position of said arms, link and contacts to vary the position of said one arm relative to said member for operation of said one arm by said member at different speeds of operation of the automobile.

References Cited in the file of this patent

UNITED STATES PATENTS

| Number | Name | Date |
| --- | --- | --- |
| 877,175 | De Fore | Jan. 21, 1908 |
| 910,414 | Perrin | Jan. 19, 1909 |
| 1,117,361 | Evans | Nov. 17, 1914 |
| 1,162,361 | Huddleston | Nov. 30, 1915 |
| 1,250,290 | Duncan | Dec. 18, 1917 |
| 1,284,604 | Core | Nov. 12, 1918 |
| 1,384,730 | Crawford | July 12, 1921 |
| 2,111,284 | Girl et al. | Mar. 15, 1938 |
| 2,206,503 | Jennings, Jr. | July 2, 1940 |
| 2,211,466 | Kende | Aug. 13, 1940 |